US006711657B1

(12) United States Patent
Sexton et al.

(10) Patent No.: US 6,711,657 B1
(45) Date of Patent: *Mar. 23, 2004

(54) METHODS FOR MANAGING MEMORY IN A RUN-TIME ENVIRONMENT INCLUDING REGISTRATION OF A DEALLOCATION ROUTINE AT EXPLICIT, LAZY INITIALIZATION

(75) Inventors: Harlan Sexton, Palo Alto, CA (US); Peter Benson, Boulder, UT (US); Jerry Schwarz, Palo Alto, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,619

(22) Filed: Feb. 25, 2000

Related U.S. Application Data

(60) Provisional application No. 60/160,759, filed on Oct. 21, 1999, provisional application No. 60/185,136, filed on Feb. 25, 2000, provisional application No. 60/185,139, filed on Feb. 25, 2000, provisional application No. 60/185,138, filed on Feb. 25, 2000, provisional application No. 60/185,134, filed on Feb. 25, 2000, provisional application No. 60/185,137, filed on Feb. 25, 2000, and provisional application No. 60/185,135, filed on Feb. 25, 2000.

(51) Int. Cl.[7] .............................. G06F 12/00; G06F 9/44
(52) U.S. Cl. .................... 711/170; 707/205; 717/118
(58) Field of Search ..................... 711/170; 707/205; 717/118

(56) References Cited

U.S. PATENT DOCUMENTS 6,161,147 A * 12/2000 Snyder et al. ............... 709/310
6,275,916 B1 * 8/2001 Weldon, Jr. et al. ........ 711/170

OTHER PUBLICATIONS

Oracle 8i/Oracle 8 Java Developer's Guide, Release 8.1.5, Feb. 1999, pp. 1–17.*

* cited by examiner

*Primary Examiner*—Glenn Gossage
(74) *Attorney, Agent, or Firm*—Dithavong & Carlson, P.C.

(57) ABSTRACT

Methods of memory management in a run-time environment are described. A mechanism is provided for registering a routine to deinitialize or deallocate a large object at the end of a call (e.g. by setting it to null to unreference the object), which prevents the large object from being migrated into session memory, e.g. when live objects are migrated at the end of the call. This routine is called after the finalization of garbage collected objects that may use the large object. In a subsequent call, the large object is checked before use to determine if the object is deinitialized and re-initialized if the large object was deinitialized.

20 Claims, 3 Drawing Sheets

METHODS FOR MANAGING MEMORY IN A RUN-TIME ENVIRONMENT INCLUDING REGISTRATION OF A DEALLOCATION ROUTINE AT EXPLICIT, LAZY INITIALIZATION

RELATED APPLICATIONS

The present application claims the benefit of the following U.S. Provisional Patent Applications, the contents of all of which are incorporated by reference in their entirety:

- U.S. Provisional Patent Application Ser. No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;
- U.S. Provisional Patent Application Ser. No. 60/185,136 entitled MEMORY MANAGEMENT USING MIGRATION FOR A RUN-TIME ENVIRONMENT, filed on Feb. 25, 2000 by Harlan Sexton et al.;
- U.S. Provisional Patent Application Ser. No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton.;
- U.S. Provisional Patent Application Ser. No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;
- U.S. Provisional Patent Application Ser. No. 60/185,134 entitled AURORA NATIVE COMPILATION, filed on Feb. 25, 2000 by Dmitry Nizhegorodov; and
- U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.;
- U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, U.S. Patent Applications, the contents of all of which are incorporated by reference in their entirety:

- U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al., now U.S. Pat. No. 6,457,019;
- U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al., now U.S. Pat. No. 6,499,095;
- U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;
- U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al., now U.S. Pat. No. 6,434,685;
- U.S. patent application Ser. No. 09/320,578 entitled METHOD AND ARTICLE FOR ACCESSING SLOTS OF PAGED OBJECTS, filed on May 27, 1999 by Harlan Sexton et al., now U.S. Pat. No. 6,401,185, issued Jun. 4, 2002;
- U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al.;
- U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;
- U.S. patent application Ser. No. 09/512,621 entitled. SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al.;
- U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.; and
- U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to a method for managing memory in a run-time environment.

BACKGROUND OF THE INVENTION

A dynamic run-time environment for a programming language, such as JAVA™, is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is an instance of a native type that contains the address of the object in the main memory, which can be a real memory address or, more commonly, a virtual address on a machine that implements a virtual memory system.

One popular run-time environment is a JAVA™ programming language virtual machine, which supports a platform-independent, object-oriented language developed by Sun Microsystems. In the JAVA™ programming language, the attributes and methods for a class of objects are typically defined in a source file, which is compiled into an architecture-neutral object file containing bytecodes that are interpreted in the virtual machine at the target platform. It is common for objects to reference other objects.

Lately, there has been much interest in using the JAVA™ programming language in a multi-user environment that allows multiple users to connect in separate, concurrent sessions to a server system, such as a relational database system. When designing a run-time environment for such a multi-user environment, scalability in terms of the number of simultaneous users who can establish separate sessions is very important. A significant constraint for user scalability is the size of the memory footprint that each session consumes. For example, a server system may have 100 megabytes (Mb) of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates A call is the period of time, when the user is actively using the server, such as during execution of a Structured Query Language (SQL) statement in a database server. Accordingly, those objects that do not need to live beyond the duration of the call are placed in the call memory rather than session memory. When the call is completed, objects in the call memory are deallocated and the call-duration memory is reclaimed for use. This approach has been implemented in Oracle Corporation's PL/SQL™ language, for instance, in which objects are explicitly declared as having the duration of a call or of a session. Memory management in such a language is straightforward because the objects are simply allocated in the memory that corresponds to their duration.

The JAVA™ programming language, however, defines the lifetime of many objects, especially system objects, to extend throughout the duration of a session and does not have the notion of a call or call duration in the programming model. Therefore, the run-time environment mush have a policy for using call memory. Accordingly, one approach is to simply ignore the provision of the call memory by the multi-user system and allocate every object in session memory, but this approach suffers from scalability because short-lived objects are unnecessarily allocated in session memory.

Another approach is to allocate objects first in the shorter-duration call memory, and then, at the time the call terminates, migrate the objects into the longer duration session memory. In this approach, session memory is consumed only if the object is still alive at the end of the call. The JAVA™ programming language, however, imposes restrictions on this approach by requiring several system classes to store large objects in static class variables. Use of static class variables is also common in user code. In many cases, the state of the these objects is no longer relevant after the call, but they are still considered alive at the end of the call. Therefore, the above-described migration policy causes these large objects to be migrated into session memory even though the state of the large object is no longer relevant, thereby increasing session memory requirements per session and reducing scalability.

For example, the standard input, output, and error streams maintain large input/output (I/O) buffers that merely reserve space for temporary use by the streams. Typically, when the call terminates the I/O buffers are flushed so that no meaningful information remains in the buffer. However, the I/O buffer itself is still a live object, being referenced by its stream class. Therefore, the migration process of copying a stream object at the end of the call to session memory forces the copying of a large, but essentially empty object into session space.

In this example, there is a problem if the user directly attempts to reduce the session memory consumed by these objects by unreferencing the I/O buffer before the end of the call. Unreferencing an object causes the garbage collector to deallocate the object at the end of the call. If the I/O buffer was unreferenced, the I/O buffer would not be available for use in the finalization of other garbage collected objects at the end of call. Some objects, for example, will print an error message using a stream in their finalization code, which is called when the objects are garbage collected. In this scenario, at worst, the null I/O buffer would cause a run-time error or exception, and, at best, the I/O buffer would be reallocated. In the latter case, the I/O buffer is still alive at the end of call and is therefore migrated to session memory, thereby defeating the purpose of the user's direct attempt to reduce the session memory usage.

The space used by such objects is substantial, on the order of 150 Kb for a JAVA™ programming language "Hello World" program, thereby seriously affecting the scalability of the system. Therefore, there is a need for improving the scalability of such run-time environments.

SUMMARY OF THE INVENTION

This and other needs are addressed by the present invention by providing a mechanism for registering a routine to deinitialize the large object in a class static variable at the end of call (e.g. by setting the class variable to null to unreference the large object), which prevents the large object from being migrated into session memory. This routine is called after the finalization of garbage collected objects that may use the large object. In a subsequent call, the large object is checked before use and re-initialized if the large object was still deallocated. In the stream example, after finalization of garbage collected objects, the I/O buffer is deinitialized, thereby preventing the I/O buffer from being copied into session memory. When the stream is later used in another call, the I/O buffer is checked and, if null, re-initialized.

Accordingly, one aspect of the invention relates to a method and software for managing memory in a run-time environment by registering a routine to deinitialize an object at an end of a call, and, at the end of the call, executing the routine to deinitialize the object. This method may be implemented in a context in which live objects are migrated from a shorter-duration (e.g. call) memory to a longer-duration (e.g. session) memory. In one embodiment, the routine is invoked after finalizing or otherwise cleaning up non-live objects during garbage collection at the end of the call. In an embodiment, an enclosing object that contains a reference to the object (e.g. a stream object enclosing the I/O buffer) is also registered as a key, to facilitate garbage collection of the object.

Another aspect of the invention relates to a method and software for managing memory in a run-time environment. Before use of an object, the object is checked to determine if the object is uninitialized and, if the object is uninitialized (e.g. null), then the object is initialized; and a routine is registered to deinitialize the object at an end of a call. At the end of the call, the routine is executed to deinitialize the object (e.g. by setting the object to null). In one embodiment, the routine is invoked after finalizing non-live objects during garbage collection at the end of the call.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for memory management in a run-time environment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
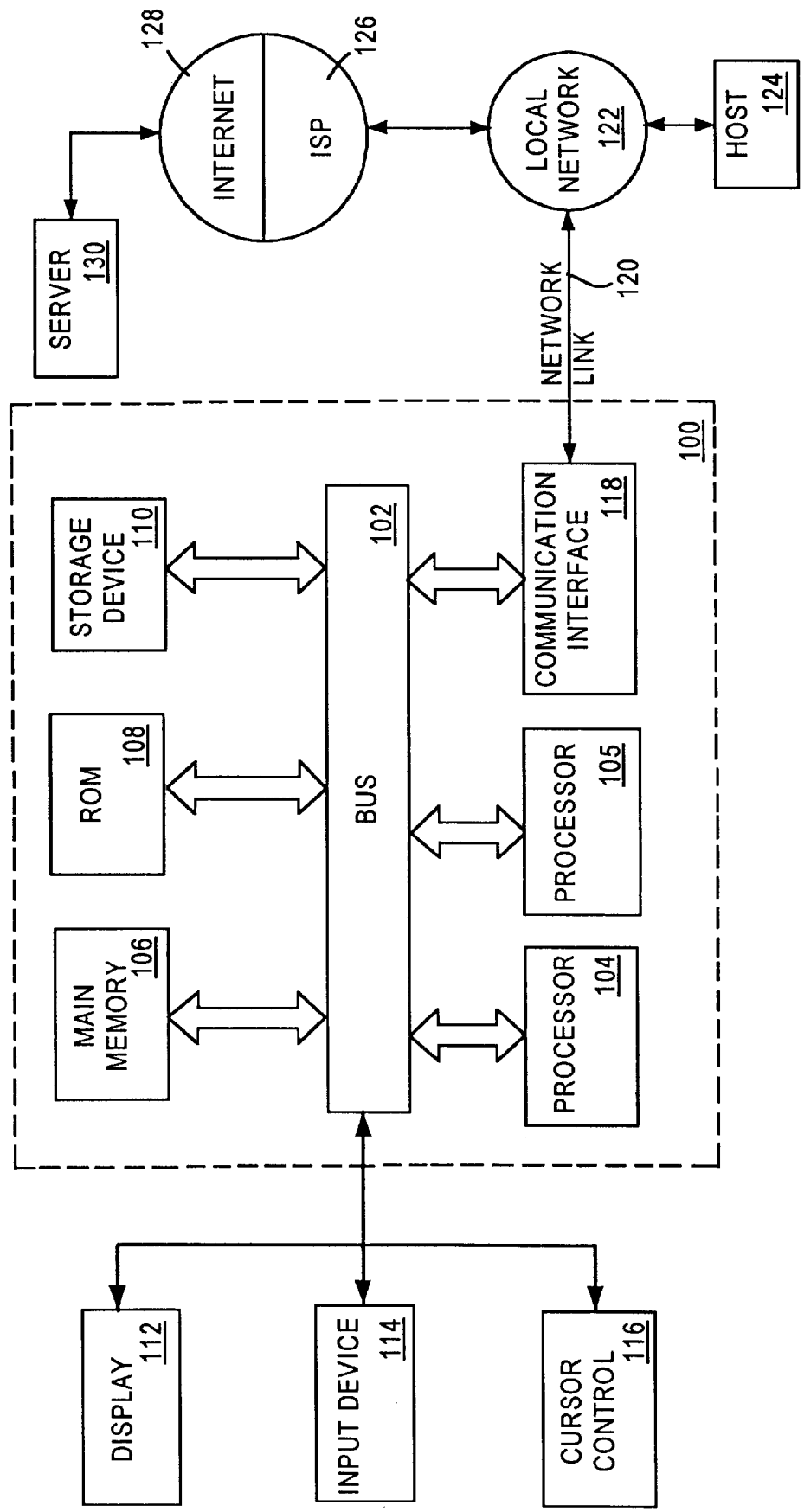
FIG. 1 depicts a computer system that can be used to implement an embodiment of the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

MEMORY MODEL

Figure 2:
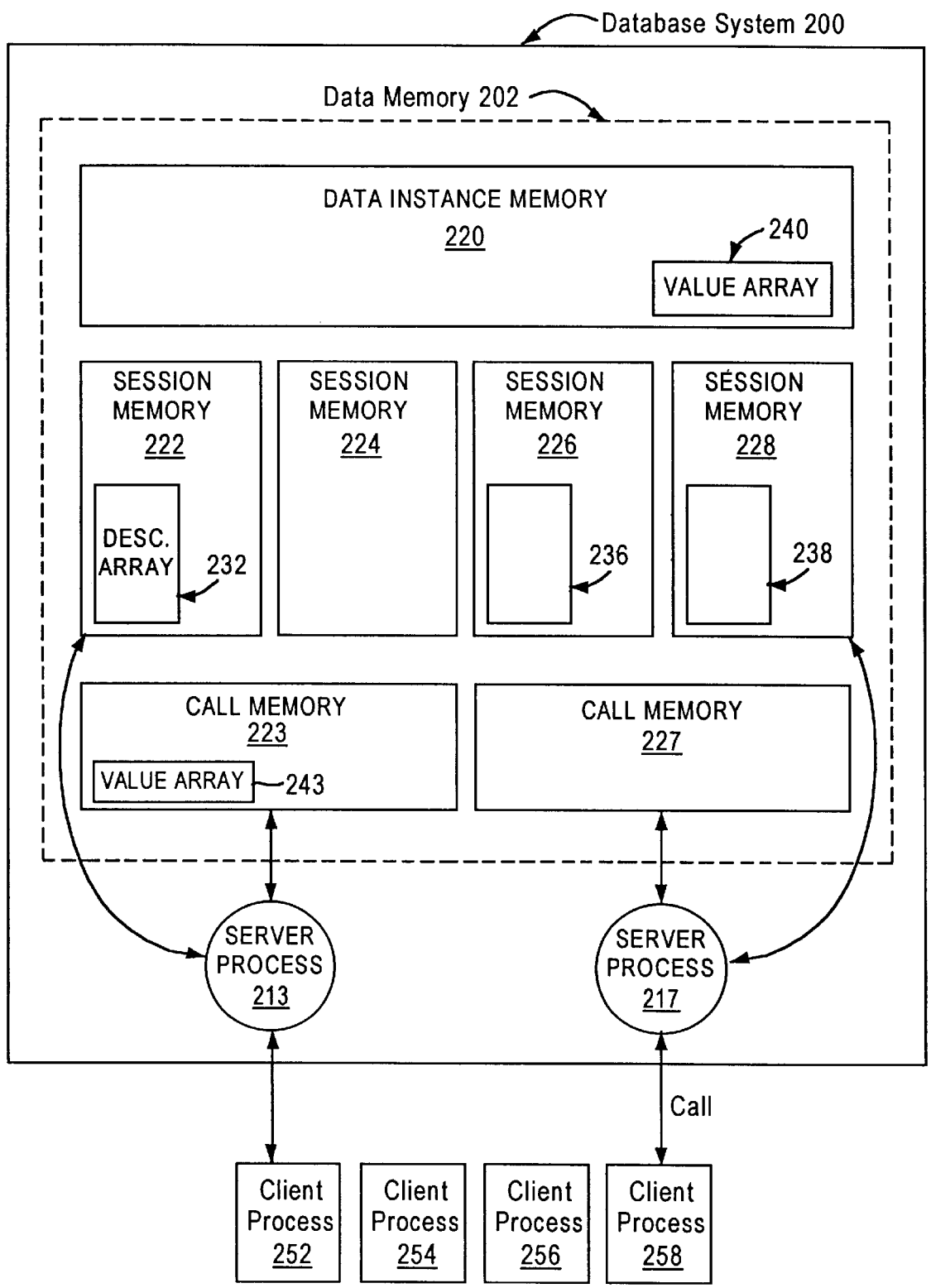
FIG. 2 is a schematic drawing of database server memory model for use with an embodiment of the present invention.

FIG. 2 schematically illustrates a multi-user database system 200 with which a run-time environment for a language such as the JAVA™ programming language may be used, although the present invention is not limited to multi-user database systems in particular and may be applied to other multi-user systems. In the illustrated configuration, clients processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA™ programming language object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of JAVA™ programming language classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, i.e., data associated with a user that is preserved for the duration of a series of calls, especially between calls issued by a client during a single database session. JAVA™ programming language static class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Explicit Lazy Initialization

In accordance with one aspect of the invention, the following programming model is adopted for those objects in static class variables, such as I/O buffers in streams, that do not hold useful information at the end of call but would still be alive to be migrated to session memory. Accordingly, "lazy initialization" is used with these objects to defer their actual initialization until immediately before their use. Since these objects are only initialized when needed, these objects can be deinitialized by zeroing or otherwise setting the object to an uninitialized state when no longer needed, such as at the end of the call, thereby preventing their needless migration to session memory.

In one embodiment, this lazy initialization is explicit, in that the programming model for these objects requires code to be written for checking any potential use of a variable holding one of these objects to first determine if the object is uninitialized, for example, by checking to determine if the object is null. If the object is null, then the object is (re)initialized. Furthermore, to provide the proper timing of deinitializing the object at the end of the call, a callback routine is registered at initialization time with the memory manager to deinitialize the object. This callback routine is invoked by the memory manager during the end of call processing.

Figure 3:
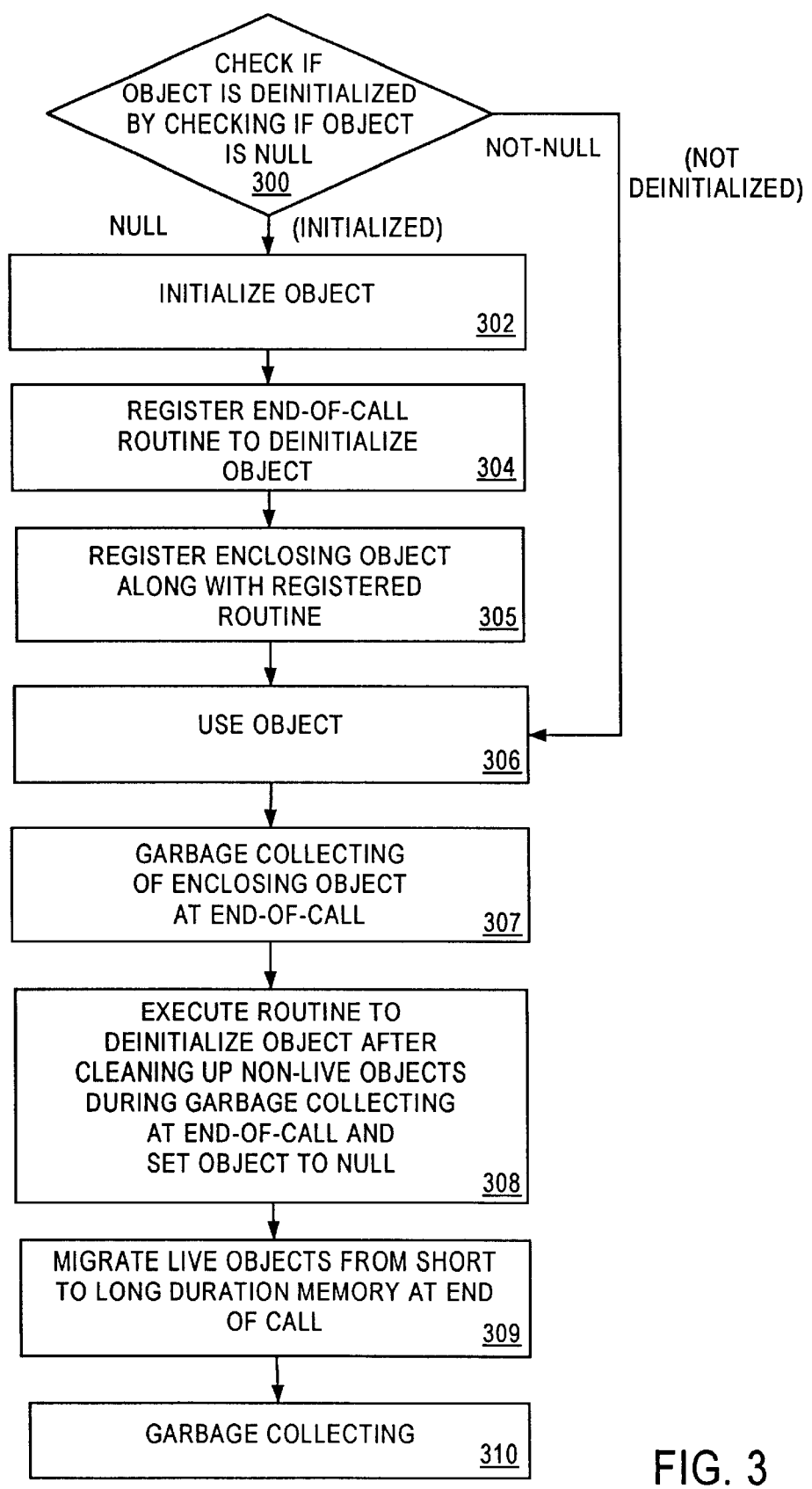
FIG. 3 is a flow diagram of managing memory for an object using explicit, lazy initialization in accordance with one embodiment of the present invention.

FIG. 3 is a flow diagram illustrating the operation of managing memory using explicit lazy initialization in accordance with one embodiment. In general, this explicit lazy initialization technique is most useful when the points of potential use of the object are concentrated in a few private places in the code, for example, in the case of using an I/O buffer in a stream. Therefore, for purposes of explanation, the operation illustrated in FIG. 3 is explained using the I/O buffer as an example, although it is to be understood that the present invention is not limited to this particular example.

Referring to FIG. 3, an object is checked in step 300 before use to determine if the object is uninitialized. This check may be performed by checking if the object is null. If the object is not uninitialized, then execution branches to step 306. On the other hand, if the object is uninitialized, then the object is initialized in step 302, for example, by allocating or finding memory for the object. Preferably, at this point, an end-of-call routine is registered in step 304 with the memory manager to arrange for the object to be deinitialized at the end of a call, which prevents the object from being migrated into session memory. After initialization, execution proceeds to step 306. At step 306, the object is used. For example, if the object is an O/I buffer, then the I/O buffer is filled with characters to be output.

Step 308 is performed at the end of a call, before migration (step 309). In particular, the memory manager steps through the end-of-call registry and invokes the registered end-of-call routines. When the end-of-call routines are invoked, instructions are executed to deinitialize the object so that the object does not have any memory to be migrated to session memory. Typically, the deinitialization is performed by finalizing or some optional clean up of the object (e.g. flushing an I/O buffer) and setting the object to null, which unreferences the memory previously allocated for the object and allows that memory to reclaimed by a garbage collector (step 310).

In the example of implementing this technique for an I/O buffer for a stream, steps 300, 302, and 304 may be performed in an ensureOpen ( ) routine that is always called by the write methods of the stream to ensure that I/O buffer is open. The following is sample code for the ensureOpen ( ) routine in one implementation:

```
private void ensureOpen() throws IOException {
    if (out == null)
        throw new IOException("Stream closed");
    if (cb == null) {                         // Step 300
        cb = new char[cbSize];                // Step 302
        memoryManager.EndOfCallRegistry.
            registerCallback(this);           // Step 304
    }
}
```

In the code example, the lazy initialization is explicit because the class implementer provides the actual code for checking the object and then initializing the object. Furthermore, a memoryManager.EndOfCallRegistry.registerCallback( )routine is called to arrange for the deinitialization routine of the object to be invoked at the end of the call. In one implementation, the deinitialization routine is provided by having the stream class to implement the memoryManager.Callback interface, which contains a function, called act ( ) in this example, to do the end of call processing:

```
public class BufferedWriter extends Writer
        implements memoryManager.Callback {
// . . .
    public void act() {
        if (cb != null) {
            try {
                flushBuffer();
            }
            catch (IOException e) {
                // just ignore exception
            }
            cb = null;         // Deinitialize I/O buffer
        }
    }
// . . .
}
```

However, the present invention is not limited to this technique for registering the function to be invoked at the end-of-call processing, and other techniques may be employed. For example, instead of requiring the BufferedWriter class to implement an interface with the act ( ) routine, a thunk that is set to an instance with a deinitialization method can be explicitly passed to the registration routine. As another example, a pointer to a function or member function can be passed to the registration routine in those languages that support this construct.

When the registration routine is called, the registration routine saves an entry to invoke the act ( ) routine in an end-of-call registry maintained by the memory manager. This registry is stepped through at the end of call to invoke the act methods registered therein to clear out the objects. Consequently, the end-of-call registry contains a strong reference to the object. This strong reference, however, prevents the object from being garbage collected earlier if the object is no longer otherwise used reference, for example, by another object that encloses the object. In the stream example, when an new stream and its I/O buffer is created, an entry to deinitialize the I/O buffer is saved in the end-of-call registry. If this stream is garbage collected before the end of the call, the I/O buffer will not also be garbage collected because the end-of-call registry still has a strong reference to the I/O buffer, in the act ( ) routine.

In one embodiment, therefore, the registration routine is also passed a key value, this, which is an object that references the object to be deinitialized. The purpose of the key value is to identify this enclosing object (step 305), so that when the enclosing object is garbage collected (step 307), the entry in the end-of-call registry that deinitializes the object that has a key that matches the enclosing object can also be thrown away, thereby allowing the object to be garbage collected. In the stream example, when the stream is garbage collected, the entry in the end-of-call registry that deinitializes the object that has a key that matches the stream is thrown away, thereby allowing for the I/O buffer referenced in the end-of-call registry to be garbage collected. In one implementation, registration is "weak" in the object whose slot is getting cleaned. In other words, the registry holds onto the object weakly, for example, with a weak pointer.

Therefore, a mechanism has been described in which an end-of-call routine is registered to deinitialize an object so that the object is not migrated into session memory. The primary advantage of this mechanism is that a simple way has been provided for users to reduce the session memory footprint. Applying this technique to a handful of JAVA™ programming language system classes, especially the stream classes, has reduced the session memory footprint for a "Hello, World!" program from over 170 kilobytes (Kb) to under 50 Kb, which enables at least three times as many users to have concurrent sessions.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing memory in a run-time environment, comprising the steps of:
   registering a routine to deinitialize an object at an end of a call; and
   executing the routine to deinitialize the object at the end of the call.

2. The method according to claim 1, further comprising the step of:
   migrating live objects from a shorter-duration memory to a longer-duration memory at the end of the call.

3. The method according to claim 1, further comprising the step of:
   garbage collecting the object at the end of the call,
   wherein the executing of the routine to deinitialize the object is performed after cleaning up non-live objects during the garbage collecting.

4. The method according to claim 1, further comprising the step of registering an enclosing object along with the registered routine, said enclosing object containing a reference to the object.

5. The method according to claim 4, further comprising the step of garbage collecting the enclosing object and the object at the end of the call.

6. A method of managing memory in a run-time environment, comprising the steps of:
   before use of an object, checking to determine if the object is uninitialized and, if the object is uninitialized, then performing the steps of:
   initializing the object; and
   registering a routine to deinitialize the object at an end of a call; and
   executing the routine to deinitialize the object at the end of the call.

7. The method according to claim 6, wherein:
   said checking to determine if the object is deinitialized includes checking to determine if the object is null; and
   the executing of the routine to deinitialize the object includes setting the object to null.

8. The method according to claim 6, further comprising the step of:
   garbage collecting the object at the end of the call,
   wherein the executing of the routine to deinitialize the object is performed after cleaning up non-live objects during the garbage collecting.

9. The method according to claim 6, further comprising the step of registering an enclosing object along with the registered routine, said enclosing object containing a reference to the object.

10. The method according to claim 9, further comprising the step of garbage collecting the enclosing object and the object at the end of the call.

11. A computer-readable medium bearing instructions for managing memory in a run-time environment, said instructions being arranged to cause one or more processors upon execution thereby to perform the steps of:
    registering a routine to deinitialize an object at an end of a call; and
    executing the routine to deinitialize the object at the end of the call.

12. The computer-readable medium according to claim 11, further bearing instructions for performing the step of:
    migrating live objects from a shorter-duration memory to a longer-duration memory at the end of the call.

13. The computer-readable medium according to claim 11, further comprising the step of:
    garbage collecting the object at the end of the call,
    wherein the executing of the routine to deinitialize the object is performed after finalizing non-live objects during the garbage collecting.

14. The computer-readable medium according to claim 11, further comprising the step of registering an enclosing object along with the registered routine, said enclosing object containing a reference to the object.

15. The computer-readable medium according to claim 14, further comprising the step of garbage collecting the enclosing object and the object at the end of the call.

16. A computer-readable medium bearing instructions for managing memory in a run-time environment, said instructions being arranged to cause one or more processors upon execution thereby to perform the steps of:
    before use of an object, checking to determine if the object is uninitialized and, if the object is uninitialized, then performing the steps of:

initializing the object; and
registering a routine to deinitialize the object at an end of a call; and
executing the routine to deinitialize the object at the end of the call.

17. The computer-readable medium according to claim 16, wherein:
said checking to determine if the object is uninitialized includes checking to determine if the object is null; and
the executing of the routine to deinitialize the object includes setting the object to null.

18. The computer-readable medium according to claim 16, further comprising the step of:
garbage collecting the object at the end of the call,
wherein the executing of the routine to deinitialize the object is performed after finalizing non-live objects during the garbage collecting.

19. The computer-readable medium according to claim 16, further comprising the step of registering an enclosing object along with the registered routine, said enclosing object containing a reference to the object.

20. The computer-readable medium according to claim 19, further comprising the step of garbage collecting the enclosing object and the object at the end of the call.

* * * * *